United States Patent
Yasuda et al.

(10) Patent No.: US 7,270,463 B2
(45) Date of Patent: Sep. 18, 2007

(54) AREA LIGHT SOURCE DEVICE AND LIQUID CRYSTAL DISPLAY APPARATUS INCLUDING THE SAME

(75) Inventors: Yoshinori Yasuda, Ishikawa-gun (JP); Toshihiko Ura, Nomi (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 7 days.

(21) Appl. No.: 11/260,420

(22) Filed: Oct. 28, 2005

(65) Prior Publication Data

US 2006/0098455 A1    May 11, 2006

(30) Foreign Application Priority Data

Nov. 5, 2004    (JP) .............................. 2004-322537

(51) Int. Cl.
*F21V 7/04* (2006.01)
(52) U.S. Cl. .................. 362/610; 362/623; 362/216
(58) Field of Classification Search ................ 362/600, 362/610, 630, 633, 634, 623, 216
See application file for complete search history.

(56) References Cited

U.S. PATENT DOCUMENTS 7,001,058 B2 * 2/2006 Inditsky .................... 362/610

2004/0027512 A1 * 2/2004 Kubomura et al. ........... 349/65
2004/0061813 A1 * 4/2004 Aoki ............................ 349/65
2005/0140847 A1 * 6/2005 Jeon ............................. 349/62

FOREIGN PATENT DOCUMENTS

JP          9-178948        7/1997

* cited by examiner

Primary Examiner—Thomas M. Sember
Assistant Examiner—Julie A. Shallenberger
(74) Attorney, Agent, or Firm—Oblon, Spivak, McClelland, Maier & Neustadt, P.C.

(57) ABSTRACT

An area light source device includes an L-shaped cold-cathode fluorescent lamp, a wedge-shaped light guide having an incidence surface, on which emission light from the cold-cathode fluorescent lamp is incident, and a reflector that surrounds the cold-cathode fluorescent lamp, has an opening facing the incidence surface, and reflects the emission light from the cold-cathode fluorescent lamp toward the light guide, wherein the opening of the reflector has a shape corresponding to shapes of two mutually neighboring incidence surfaces of the light guide.

2 Claims, 3 Drawing Sheets

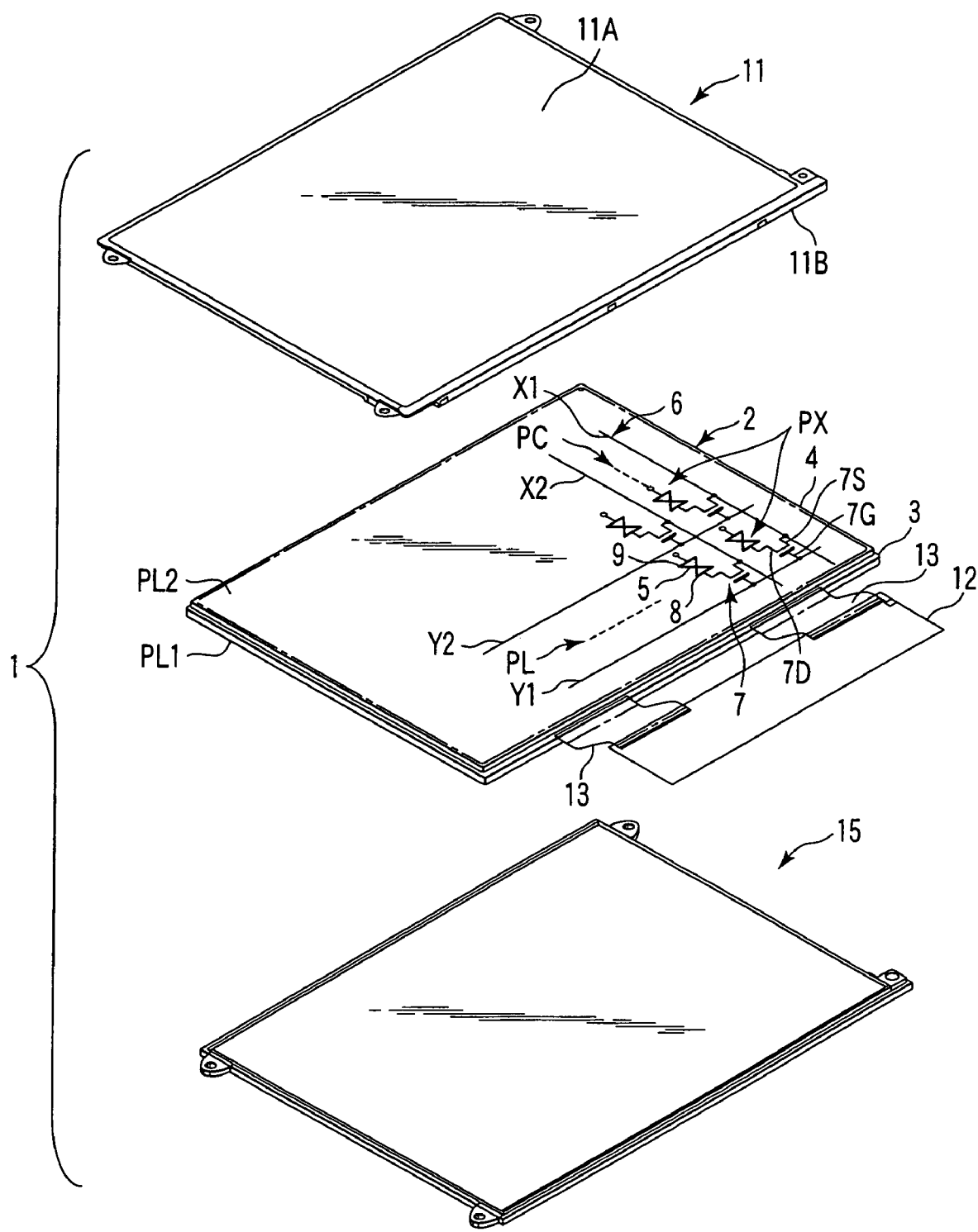
F I G. 1

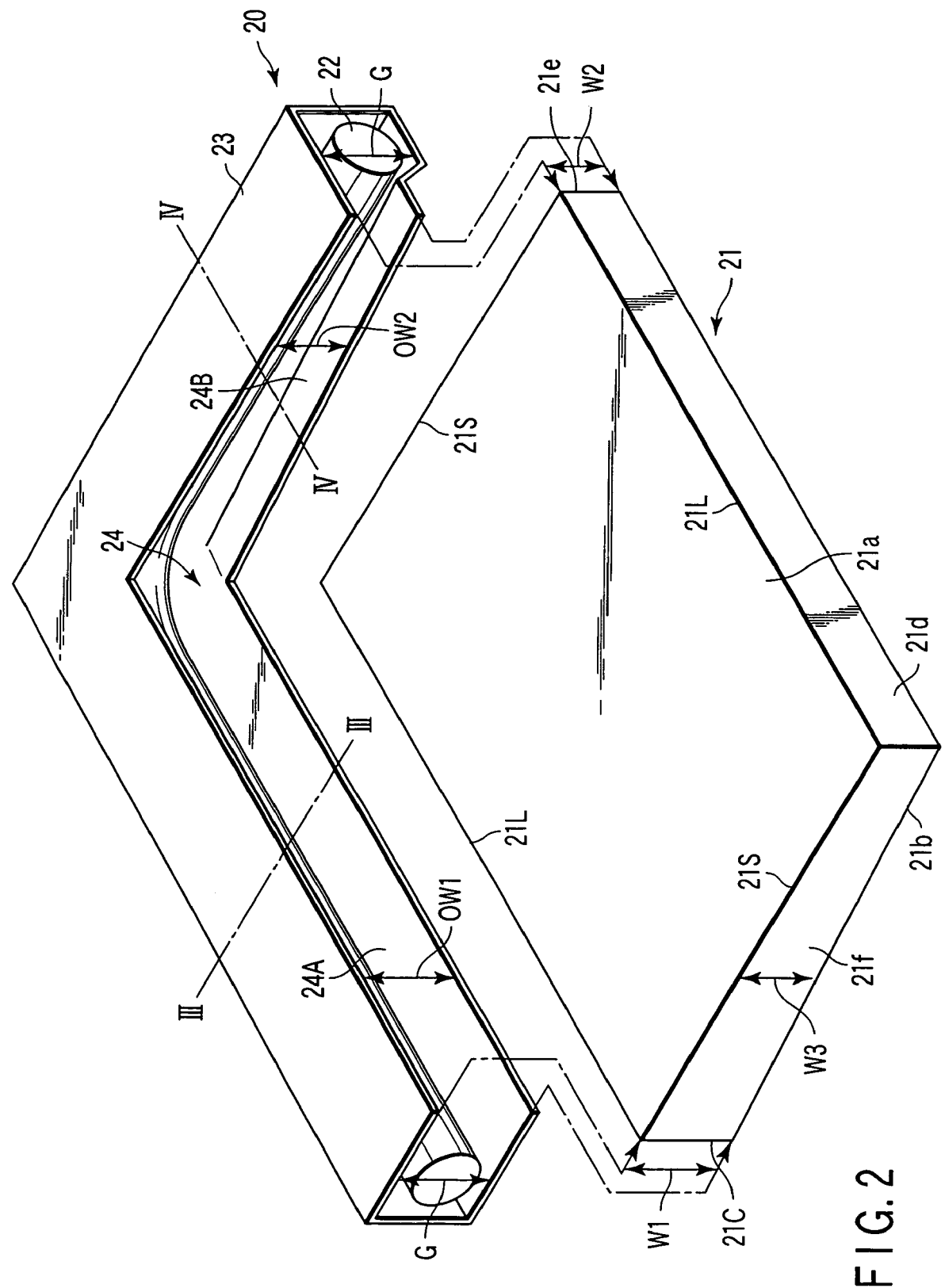
F I G. 2

AREA LIGHT SOURCE DEVICE AND LIQUID CRYSTAL DISPLAY APPARATUS INCLUDING THE SAME

CROSS-REFERENCE TO RELATED APPLICATIONS

This application is based upon and claims the benefit of priority from prior Japanese Patent Application No. 2004-322537, filed Nov. 5, 2004, the entire contents of which are incorporated herein by reference.

BACKGROUND OF THE INVENTION

1. Field of the Invention

The present invention relates generally to an area light source device and a liquid crystal display device that includes the area light source device, and more particularly to an area light source device in which an L-shaped light source and a wedge-shaped light guide are combined.

2. Description of the Related Art

Liquid crystal display devices have been applied to various fields as display devices for, e.g. OA equipment such as computers and TVs, taking advantage of their features of light weight, small thickness and low power consumption. In recent years, the liquid crystal display devices have also been used as display devices of mobile terminals such as mobile phones. This type of liquid crystal display device includes, for example, a liquid crystal display panel and an area light source device that illuminates the liquid crystal display panel.

As regards the liquid crystal display device with this structure, it has been proposed to adopt an L-shaped light source for enhancing the luminance of the area light source device, and a wedge-shaped light guide for reduction in thickness and weight (see Jpn. Pat. Appln. KOKAI Publication No. 9-178948, for instance).

In such structure as described in the above document, however, it is difficult to efficiently guide emission light from the light source to the light guide. Specifically, since the wedge-shaped light guide is adopted, the incidence surface of the light guide, which is opposed to the light source, has a trapezoidal shape corresponding to the wedge-shaped cross section and has a width (height) gradually decreasing toward a thin part of the light guide. Consequently, in the thin part, the ratio in amount of incident light from the incidence surface to emission light from the light source is considerably low, and a sufficiently high luminance may not be obtained.

BRIEF SUMMARY OF THE INVENTION

The present invention has been made in consideration of the above-described problem, and the object of the invention is to provide an area light source device capable of achieving high luminance, small thickness and light weight, and a liquid crystal display device including the area light source device.

According to a first aspect of the present invention, there is provided an area light source device comprising: an L-shaped light source; a wedge-shaped light guide having an incidence surface, on which emission light from the light source is incident, and an emission surface from which incident light that is incident from the incidence surface is emitted; an optical sheet that is disposed on the emission surface; and a reflector that surrounds the light source, has an opening facing the incidence surface, and reflects the emission light from the light source toward the light guide, wherein the opening of the reflector has a shape corresponding to shapes of two mutually neighboring incidence surfaces of the wedge-shaped light guide.

According to a second aspect of the present invention, there is provided a liquid crystal display device comprising: a liquid crystal display panel including an effective display section in which a plurality of display pixels are arranged; and an area light source device that illuminates the liquid crystal display panel, the area light source device including: an L-shaped light source; a wedge-shaped light guide having an incidence surface, on which emission light from the light source is incident, and an emission surface from which incident light that is incident from the incidence surface is emitted; an optical sheet that is disposed on the emission surface; and a reflector that surrounds the light source, has an opening facing the incidence surface, and reflects the emission light from the light source toward the light guide, wherein the opening of the reflector has a shape corresponding to shapes of two mutually neighboring incidence surfaces of the wedge-shaped light guide.

The present invention can provide an area light source device capable of achieving high luminance, small thickness and light weight, and a liquid crystal display device including the area light source device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is an exploded perspective view that schematically shows the structure of a liquid crystal display apparatus according to an embodiment of the present invention;

FIG. 2 is an exploded perspective view that schematically shows the structures of a light source section and a light guide of a backlight unit that is mounted on the liquid crystal display device shown in FIG. 1;

DETAILED DESCRIPTION OF THE INVENTION

Figure 3:
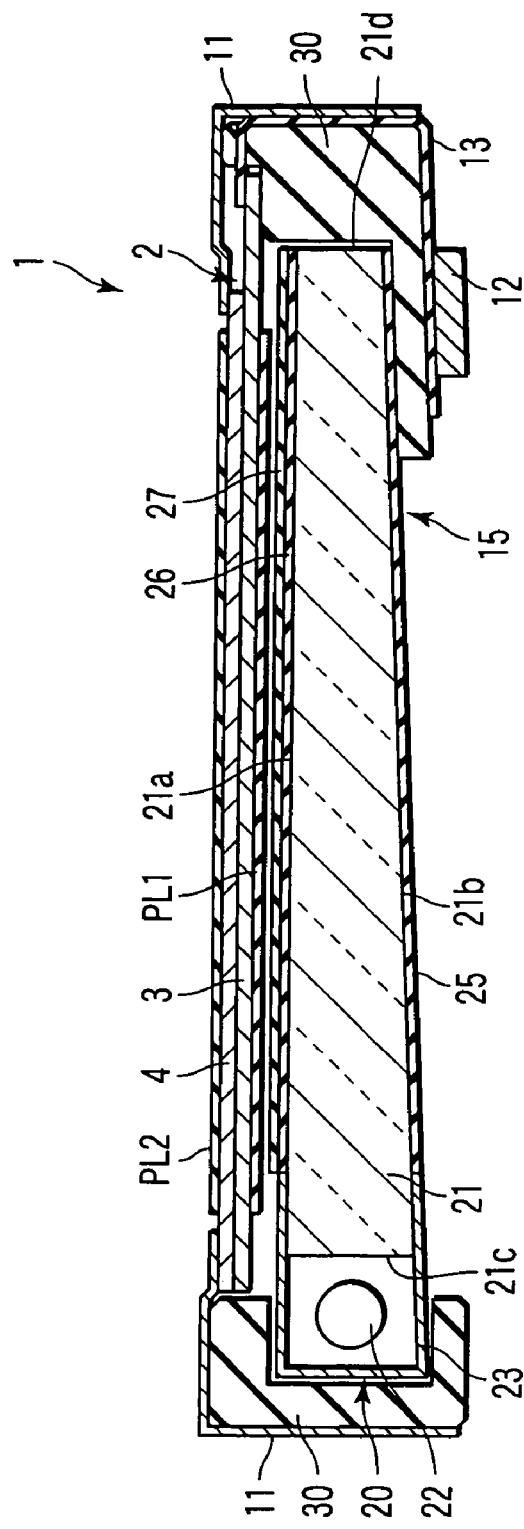
FIG. 3 is a cross-sectional view, taken along line III-III in FIG. 2, which shows the liquid crystal display device including the backlight unit.

An area light source device according to an embodiment of the present invention and a liquid crystal display device including the area light source device will now be described with reference to the accompanying drawings. Specifically, a description is given of a transmissive liquid crystal display device that selectively passes backlight from an area light source device, such as a backlight unit, and displays an image.

As is shown in FIG. 1, a liquid crystal display device 1 includes a substantially rectangular, planar transmissive liquid crystal display panel 2, and a backlight unit 15 that illuminates the liquid crystal display panel 2. The liquid crystal display panel 2 is configured such that a liquid crystal layer is held between a pair of substrates. Specifically, the liquid crystal display panel 2 includes a rectangular array substrate 3, a rectangular counter-substrate 4, and a liquid crystal layer 5 that serves as an optical modulation layer and is sealed between these paired substrates via alignment films. The array substrate 3 and counter-substrate 4 are bonded via a seal material. The liquid crystal display panel 2 includes a substantially rectangular effective display section 6, which corresponds to a display area that displays an image. The effective display section 6 is composed of a plurality of display pixels PX that are arranged in a matrix.

The array substrate 3 includes a plurality of scan lines Y (1, 2, 3, . . . , m), a plurality of signal lines X (1, 2, 3, . . . , n), switching elements 7 that are arranged in association with the respective display pixels PX, and pixel electrodes 8 that are connected to the switching elements 7.

Each of the scan lines Y extends in parallel to the rows of display pixels PX. Each of the signal lines X extends in parallel to the columns of display pixels PX so as to cross the scan lines Y. The switching elements 7 are disposed near intersections between the scan lines Y and signal lines X.

The switching element 7 is formed of, e.g. a thin-film transistor (TFT), which includes a semiconductor layer formed of, e.g. an amorphous silicon film or a polysilicon film. The switching element 7 has a gate electrode 7G that is electrically connected to the associated scan line Y (or formed integral with the scan line). The switching element 7 has a source electrode 7S that is electrically connected to the associated signal line X (or formed integral with the signal line). The switching element 7 has a drain electrode 7D that is electrically connected to the pixel electrode 8 of the associated display pixel PX.

The counter-substrate 4 includes a counter-electrode 9 that is common to all the display pixels PX in the effective display section 6. The pixel electrodes 8 and counter-electrode 9 are formed of an electrically conductive material with light transmissivity such as ITO (indium tin oxide) or IZO (indium zinc oxide). The array substrate 3 and counter-substrate 4 are disposed such that the pixel electrodes 8 are opposed to the counter-electrode 9, and a gap is provided therebetween. The liquid crystal layer 5 is formed of a liquid crystal composition that is sealed in the gap between the array substrate 3 and counter-substrate 4.

In the liquid crystal display panel 2, a pair of polarizer plates PL1 and PL2, whose directions of polarization are set in accordance with the characteristics of the liquid crystal layer 5, are provided on the outer surface of the array substrate 3 and the outer surface of the counter-substrate 4.

In a color display type liquid crystal display device, the liquid crystal display panel 2 includes a plurality of kinds of display pixels, for instance, a red pixel that displays red (R), a green pixel that displays green (G), and a blue pixel that displays blue (B). Specifically, the red pixel includes a red color filter that passes light with a principal wavelength of red. The green pixel includes a green color filter that passes light with a principal wavelength of green. The blue pixel includes a blue color filter that passes light with a principal wavelength of blue. These color filters are disposed on a major surface of the array substrate 3 or counter-substrate 4.

The liquid crystal display device includes a bezel cover 11 having a rectangular frame-like shape. The bezel cover 11 includes a rectangular window section 11A that exposes the effective display section 6 of the liquid crystal display panel 2, and a main body 11B that has a rectangular frame-like shape and defines the window section 11A. The liquid crystal display panel 2 with the above-described structure is held between the backlight unit 15 and the bezel cover 11. Specifically, the backlight 15, together with the liquid crystal display panel 2, is formed integral with the bezel cover 11 in the state in which the upper surface of the backlight 15 is opposed to the back surface (array substrate-side surface) of the liquid crystal display panel 2. The backlight 15 illuminates the back side of the liquid crystal display panel 2.

Further, the liquid crystal display device includes a driver circuit 12, which supplies a drive signal to the liquid crystal display panel 2. The driver circuit 12 has, e.g. an elongated rectangular, planar shape, and is electrically connected to one side edge of the liquid crystal display panel 2 via a flexible printed circuit board 13. The driver circuit 12 can be positioned on the back side of the backlight 15 by bending the printed circuit board 13 (i.e. positioned at a thin part of a light guide 21 to be described later).

Figure 4:
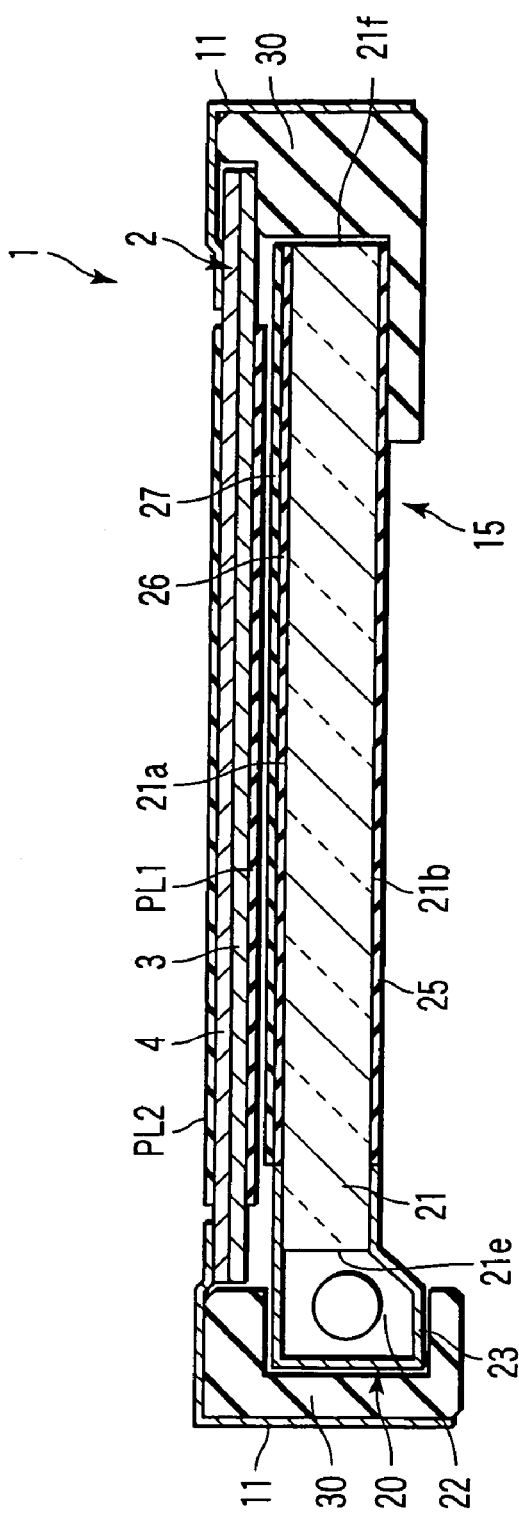
FIG. 4 is a cross-sectional view, taken along line IV-IV in FIG. 2, which shows the liquid crystal display device including the backlight unit.

As is shown in FIG. 1 to FIG. 4, the backlight unit 15 includes a light source section 20 and a light guide 21. FIG. 2 shows only the light source section 20 and light guide 21 for the purpose of simple description. FIG. 3 is a cross-sectional view, taken along line III-III in FIG. 2, which shows the liquid crystal display device including the backlight unit 15. FIG. 4 is a cross-sectional view, taken along line IV-IV in FIG. 2, which shows the liquid crystal display device including the backlight unit 15.

The light source section 20 includes an L-shaped cold-cathode fluorescent lamp 22 as a light source, and a reflector 23 that surrounds the cold-cathode fluorescent lamp 22 and reflects emission light from the cold-cathode fluorescent lamp 22 toward the light guide. The reflector 23 has a substantially U-shaped cross section and has an opening 24 for extracting emission light from the cold-cathode fluorescent lamp 22.

The light guide 21 converts emission light from the cold-cathode fluorescent lamp 22 to planar light and emits the planar light. Specifically, the light guide 21 is formed of a light transmissive resin material such as an acrylic resin or a polycarbonate resin. The light guide 21 has a wedge-like plate shape with a thick part at one end and a thin part at the other end that is opposed to the thick part. The thickness of the light guide 21, in this context, corresponds to a height in a direction normal to a first major surface 21a that faces the liquid crystal display panel 2.

The light guide 21 includes the substantially rectangular first major surface 21a; a substantially rectangular second major surface 21b that is opposed to the first major surface 21a; substantially rectangular first side surface 21c and second side surface 21d that connect the first major surface 21a and second major surface 21b; and substantially trapezoidal third side surface 21e and fourth side surface 21f.

The first side surface 21c is formed at the thick part, and has a rectangular shape with a substantially uniform width W1. The second side surface 21d is formed at the thin part, and has a rectangular shape with a substantially uniform width W2. The width of the first side surface 21c is greater than that of the second side surface 21d (W1>W2). Each of the third side surface 21e and fourth side surface 21f has the same shape as the wedge-shaped cross section, that is, a trapezoidal shape with a width W3 gradually decreasing from one end (i.e. the thick part) toward the other end (i.e. the thin part). The widths W1 to W3 of the first to fourth side surfaces, in this description, correspond to heights in a direction normal to the first major surface 21a.

In this embodiment, the first side surface 21c and second side surface 21d extend along a long side 21L of the light guide 21. The third side surface 21e and fourth side surface 21f extend along a short side 21S of the light guide 21.

The light source section 20 is disposed along one long side 21L of the light guide 21 and one short side 21S that neighbors the long side 21L. In other words, the cold-cathode fluorescent lamp 22 is disposed so as to face almost the entirety of the first side surface 21c along the long side 21L of the light guide 21 and almost the entirety of the third side surface 21e along the short side 21S of the light guide 21.

Specifically, the first side surface 21c of the light guide 21 corresponds to a first incidence surface on which emission light from the cold-cathode fluorescent lamp 22 is incident. The third side surface 21e of the light guide 21 corresponds to a second incidence surface on which emission light from the cold-cathode fluorescent lamp 22 is incident.

In accordance with this configuration, the reflector 23 is disposed such that the opening 24 faces the first side surface 21c and third side surface 21e that function as two mutually neighboring incidence surfaces of the light guide 21. The opening 24 includes a first opening portion 24A that faces the first side surface 21c, which corresponds to the first incidence surface, and a second opening portion 24B that faces the third side surface 21e, which corresponds to the second incidence surface.

The first opening portion 24A corresponds to the first side surface 21c and has a substantially uniform opening width OW1. The opening width OW1 of the first opening portion 24A is substantially equal to the width W1 of the first side surface 21c. The second opening portion 24B corresponds to the third side surface 21e and has an opening width OW2 that gradually decreases from one end (i.e. the thick part) toward the other end (i.e. the thin part). The opening width OW2 of the second opening portion 24B varies substantially in accordance with the width W3 of the third side surface 21e. In other words, the opening width at one end of the second opening portion 24B (i.e. at a crossing part between the first opening portion 24A and second opening portion 24B) is substantially equal to the width W1 of the first side surface 21c, and the opening width at the other end of the second opening portion 24B is substantially equal to the width W2 of the second side surface 21d. The opening widths OW1 and OW2 of the first and second opening portions, in this description, correspond to heights in a direction normal to the first major surface 21a.

In short, the opening 24 is formed in a shape corresponding to the shapes of the incidence surfaces. The first opening portion 24A has a rectangular shape that is substantially equal to the shape of the opposed first side surface 21c, and the second opening portion 24B has a trapezoidal shape that is substantially equal to the shape of the opposed third side surface 21e.

Thereby, each of the incidence surfaces of the light guide 21 is surrounded (substantially with no gap) by the reflector 23 in the state in which the incidence surfaces face the cold-cathode fluorescent lamp 22. Emission light from the cold-cathode fluorescent lamp 22 can be guided to the incident surfaces of the light guide 21 without loss. In addition, even emission light that fails to meet the condition for incidence on the incidence surfaces (i.e. light that fails to be directly incident on the incidence surfaces) is repeatedly reflected by the reflector 23 and made incident on the incidence surfaces. Therefore, the efficiency of use of emission light can be improved.

The reflector 23 has a substantially uniform gap G along its entire length for accommodating the cold-cathode fluorescent lamp 22. In other words, on both sides opposed to the long side 21L and short side 21S of the light guide 21, the reflector 23 has a substantially uniform gap G for accommodating the cold-cathode fluorescent lamp 22, although the opening widths OW1 and OW2 are different. The gap G, in this context, corresponds to a height in a direction normal to the first major surface 21a.

The light guide 21 with this structure propagates emission light coming from the cold-cathode fluorescent lamp 22 through the first side surface 21c and third side surface 21e, and is then able to emit the light from the first major surface 21a and second major surface 21b. The first major surface 21a and second major surface 21b of the light guide 21 correspond to emission surfaces for emitting incident light that has come into the light guide 21.

The backlight unit 15 includes optical sheets disposed on the emission surfaces of the light guide 21.

Specifically, the backlight unit 15 includes a reflection surface 25 that is disposed on the second major surface 21b side of the light guide 21. The reflection sheet 25 has a function of reflecting light, which leaks out from the inside of the light guide 21 via the second major surface 21b, toward the first major surface 21a. The reflection sheet 25 is formed in a substantially rectangular shape with a size that is substantially equal to the size of the second major surface 21b.

In addition, the backlight unit 15 includes optical sheets that are disposed on the first major surface 21a side of the light guide 21. In this embodiment, the optical sheets that are disposed on the first major surface 21a side are a diffusion sheet 26 and a lens sheet 27. The diffusion sheet 26 has a function of diffusing emission light that emerges from the inside of the light guide 21 through the first major surface 21a. The diffusion sheet 26 is formed in a substantially rectangular shape with a size that is substantially equal to the size of the first major surface 21a. The lens sheet 27 has a function of collecting diffusion light that emerges from the diffusion sheet 26. The lens sheet 27 has a prism surface on a surface thereof that faces the diffusion sheet 26, or on a surface thereof that is opposed to the surface facing the diffusion sheet 26. The lens sheet 27 is formed in a substantially rectangular shape with a size that is substantially equal to the size of the diffusion sheet 26.

The optical elements, such as the light source section 20, light guide 21, reflection sheet 25, diffusion sheet 26 and lens sheet 27, are accommodated and held in a holding frame 30 that has a substantially rectangular frame-like shape. The holding frame 30 is formed of, e.g. a resin.

The liquid crystal display device with the above-described structure operates as follows. Electric energy is supplied to the cold-cathode fluorescent lamp 22 of the light source section 20, thereby turning on the cold-cathode fluorescent lamp 22. Principal emission light from the cold-cathode fluorescent lamp 22 is directly guided to the incidence surfaces (first side surface 21c and third side surface 21e) of the light guide 21. Of the emission light from the cold-cathode fluorescent lamp 22, light that is not directly incident on the light guide 21 or is reflected by the incidence surfaces of the light guide 21 is reflected by the reflector 23 and guided to the incidence surfaces.

The incident light coming through the incidence surfaces propagates through the inside of the light guide 21 and is refracted or reflected toward the first major surface 21a or second major surface 21b of the light guide 21. The emission light from the second major surface 21b of the light guide 21 is reflected by the reflection sheet 25 and sent back into the inside of the light guide 21.

The light that propagates through the inside of the light guide 21 is emitted from the first major surface 21a of the light guide 21. The emission light from the light guide 21 is properly diffused through the diffusion sheet 26. The diffusion light emerging from the diffusion sheet 6 is incident on the lens sheet 27. This incident light is properly collected through the lens sheet 27. Thereby, the luminance of the emission light from the first major surface 21a of the light guide 21 is enhanced and made uniform.

The illumination light from the backlight unit 15, that is, the light emerging from the lens sheet 27, is led out to the back side of the liquid crystal display panel 2. The illumination light that is led out to the liquid crystal display panel 2 selectively passes through the effective display section 6 of the liquid crystal display panel 2. In other words, in the effective display section 6, the transmission/non-transmission of the illumination light, which is guided to the respective display pixels PX, is selectively controlled. Thereby, an image is displayed on the effective display section 6 of the liquid crystal display panel 2.

The above-described backlight unit 15 includes the L-shaped light source and the wedge-shaped light guide. The light source is disposed so as to face the two neighboring incidence surfaces. The light source is surrounded by the reflector having the opening that corresponds in shape to the two incidence surfaces. In other words, each of the incidence surfaces of the light guide 21 is surrounded by the reflector 23 in the state in which the incidence surfaces face the cold-cathode fluorescent lamp 22. Emission light from the cold-cathode fluorescent lamp 22 can be guided to the incident surfaces of the light guide 21 without loss. In addition, even emission light that fails to meet the condition for incidence on the incidence surfaces is repeatedly reflected by the reflector 23 and made incident on the incidence surfaces.

Therefore, the efficiency of use of emission light from the L-shaped light source can be improved, and a high luminance can be achieved. Moreover, since the wedge-shaped light guide is adopted, the thickness of the light guide can be reduced, and the reduction in weight can be realized. In addition, the driver circuit can be disposed at a position corresponding to the thin part, and the reduction in thickness can be achieved.

The present invention is not limited to the above-described embodiment. In practice, the structural elements can be modified without departing from the spirit of the invention. Various inventions can be made by properly combining the structural elements disclosed in the embodiment. For example, some structural elements may be omitted from all the structural elements disclosed in the embodiment. Furthermore, structural elements in different embodiments may properly be combined.

For example, in the above-described embodiment, the backlight device, which illuminates the back side of the transmissive liquid crystal display panel, has been described as the area light source device. However, this invention is applicable to a front-light device, as an area light source device, which illuminates the front side of a reflective liquid crystal display panel.

What is claimed is:

1. An area light source device comprising:
an L-shaped light source;
a wedge-shaped light guide having an incidence surface, on which emission light from the light source is incident, and an emission surface from which incident light that is incident from the incidence surface is emitted;
an optical sheet that is disposed on the emission surface; and
a reflector that surrounds the light source, has an opening facing the incidence surface, and reflects the emission light from the light source toward the light guide, wherein
the opening of the reflector has a shape corresponding to shapes of two mutually neighboring incidence surfaces of the wedge-shaped light guide,
the incidence surface of the light guide includes a first incidence surface with a substantially uniform width, and a second incidence surface that neighbors the first incidence surface and has a width decreasing from one end to the other end thereof, and
the opening of the reflector includes a first opening portion that corresponds to the first incidence surface and has a substantially uniform opening width, and a second opening portion that corresponds to the second incidence surface and has an opening width gradually decreasing from one end toward the other end thereof.

2. A liquid crystal display device comprising:
a liquid crystal display panel including an effective display section in which a plurality of display pixels are arranged; and
an area light source device that illuminates the liquid crystal display panel,
the area light source device including:
an L-shaped light source,
a wedge-shaped light guide having an incidence surface, on which emission light from the light source is incident, and an emission surface from which incident light that is incident from the incidence surface is emitted,
an optical sheet that is disposed on the emission surface, and
a reflector that surrounds the light source, has an opening facing the incidence surface, and reflects the emission light from the light source toward the light guide, wherein
the opening of the reflector has a shape corresponding to shapes of two mutually neighboring incidence surfaces of the wedge-shaped light guide,
the incidence surface of the light guide includes a first incidence surface with a substantially uniform width, and a second incidence surface that neighbors the first incidence surface and has a width decreasing from one end to the other end thereof, and
the opening of the reflector includes a first opening portion that corresponds to the first incidence surface and has a substantially uniform opening width, and a second opening portion that corresponds to the second incidence surface and has an opening width gradually decreasing from one end toward the other end thereof.

* * * * *